United States Patent [19]

Larsson et al.

[11] Patent Number: 4,812,644

[45] Date of Patent: Mar. 14, 1989

[54] METHOD AND A DEVICE FOR ASSORTMENT OF A PRODUCT FLOW

[75] Inventors: Bertil Larsson, Höör; Erik T. Andersson, Lund; Rolf G. R. H ahansson, Höör, all of Sweden

[73] Assignee: AGEC AB, Hoor, Sweden

[21] Appl. No.: 52,758

[22] Filed: May 20, 1987

[30] Foreign Application Priority Data

May 21, 1986 [SE] Sweden ............................ 8602298-5

[51] Int. Cl.[4] ............................ G01N 9/04; G01J 3/50

[52] U.S. Cl. ................................ 250/223 R; 250/226

[58] Field of Search .................. 250/223 R, 226, 571, 250/572; 209/577, 578, 580–582

[56] References Cited

U.S. PATENT DOCUMENTS

| | | | |
|---|---|---|---|
| 3,097,744 | 7/1963 | Hutter et al. | 209/578 |
| 3,283,896 | 11/1966 | Jirik et al. | 209/582 |
| 4,236,640 | 12/1980 | Knight | 209/582 |
| 4,351,437 | 9/1982 | Long | 250/223 R |
| 4,513,868 | 4/1985 | Culling et al. | 209/581 |

*Primary Examiner*—David C. Nelms

*Assistant Examiner*—Stephen B. Allen

*Attorney, Agent, or Firm*—Bernard, Rothwell & Brown

[57] ABSTRACT

In a method and a device for assortment of objects a broadbanded light is emitted from a light source, which light is reflected via a rotary mirror against the objects falling freely immediately after they have left a conveyor belt. The reflected light is led via the other part of the same surface of the rotary mirror to an optical unit and is reflected against a double detector dividing the light flow into two wide ranges about 1 μm. The detector signals are compared to one another and after processing the resulting signal is caused to actuate means separating the objects mechanically.

6 Claims, 3 Drawing Sheets

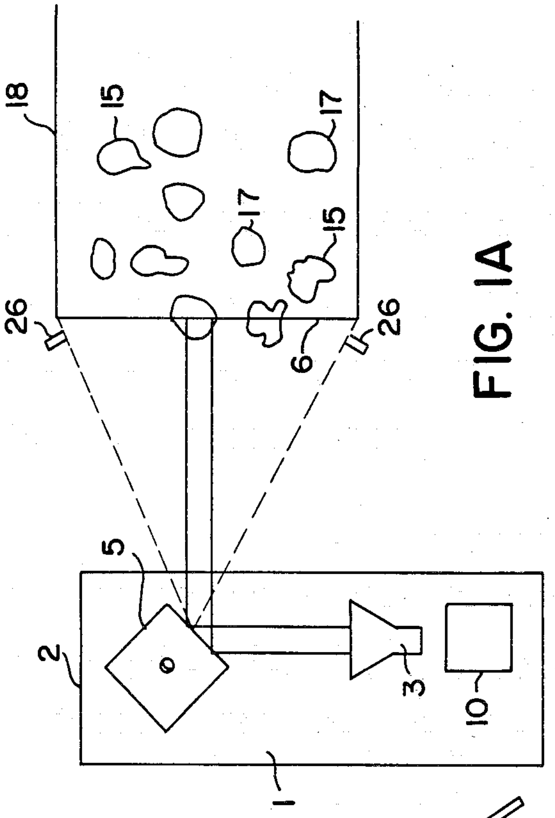
FIG. 1A
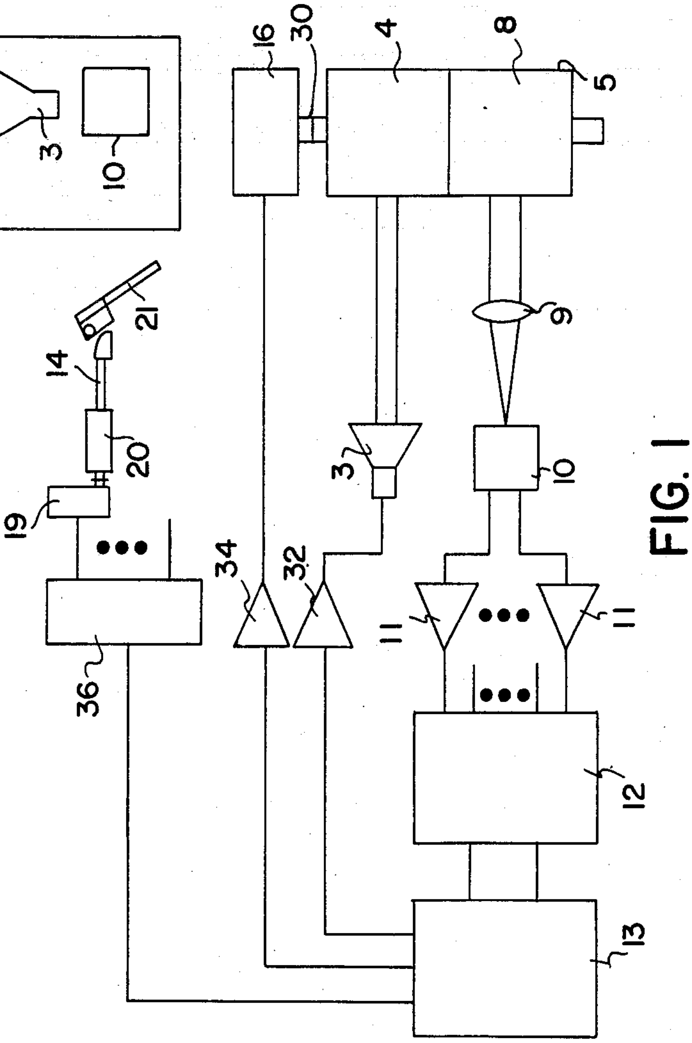
FIG. 1
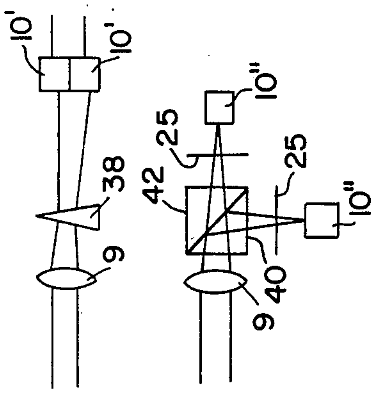
FIG. 4
FIG. 5

METHOD AND A DEVICE FOR ASSORTMENT OF A PRODUCT FLOW

BACKGROUND OF THE INVENTION

1. Field of the Invention

This invention relates to a method and a device for separating nondesired objects from a product flow. In this method an emitted broadbanded light is absorbed differently in the surface of the objects. The difference in absorption decides which type of objects is detected.

2. Background Art

In for example agriculture and horticulture there is a great need of separating contaminations such as stone and clods e.g. in potatoes and onions. Today there are manual assortment and mechanical systems with spike mats and brushes. Stones in potatoes and onions have always been a great problem. In the last two decades various mechanical stone separating devices have been developed. The two main problems of these are that mechanical separation, e.g. by means of brushes, will cause a great damage to the potatoes and it is difficult to get a mechanical system functioning satisfactorily under varying soil conditions. In electronic stone and soil separation the contaminations are removed when falling freely which eliminates the damage to the potatoes completely. Manual assortment is expensive and not quite satisfactory in view of working environment. In another method used today all stones are screened off and put between the rows of potatoes. The disadvantage of this is that the stone retains the soil moisture and the heat in the soil. In wet weather the soil will dry more slowly without stone content which delays the harvest.

In indoor assortment of potatoes there is also a need of an efficient assortment. Potatoes having green stains are today assorted quite manually at roller tables, a method that does not give a perfectly satisfactory result. A better result can be obtained by the method and device described above with a field of vision from two directions. Internationally there are many agrigultural products that can be assorted according to color. Our method and device provided with suitable filters and detectors can be seen to be of great use there.

When lifting potatoes three to four persons must supplement the mechanical assortment. By this device the capacity of the machine can be increased and the staff of workmen be reduced to one person.

SUMMARY OF THE INVENTION

The present invention provides a device for the assortment of objects in which a broad-banded light is emitted from the light source and the light is reflected via one part of a surface of a rotary mirror against objects in free-fall, such as objects immediately after they have left the conveyor belt. The light reflected from the objects is directed via a second part of the same surface of the rotary mirror to an optical unit and is refracted toward a detector. The two parts of the surface of the rotary mirror are on the same side of the mirror. The detector divides the wavelengths of light into corresponding electric signals which allow a determination of desired object or undesired object to be made. The rotary mirror is rotated to scan a scanning range in which the objects fall.

DESCRIPTION OF DRAWINGS

FIG. 1, shows a side, somewhat schematic diagram of the invention.

FIG. 1A, shows a top somewhat schematic view of the invention.

FIG. 4, shows a schematic view of a second embodiment of the invention.

FIG. 5, shows a schematic view of a third embodiment of the invention.

DETAILED DESCRIPTION OF THE PREFERRED EMBODIMENTS

The method and the device of the invention for assortment of objects are based on differences in absorption, i.e. the reflected light gives a different spectrum depending on the nature of the object. In case of stone/-potato the absorption of light having wavelengths exceeding 1 μm is great for potatoes but not for stones. This difference is used to distinguish potatoes from stones.

Figure 2:
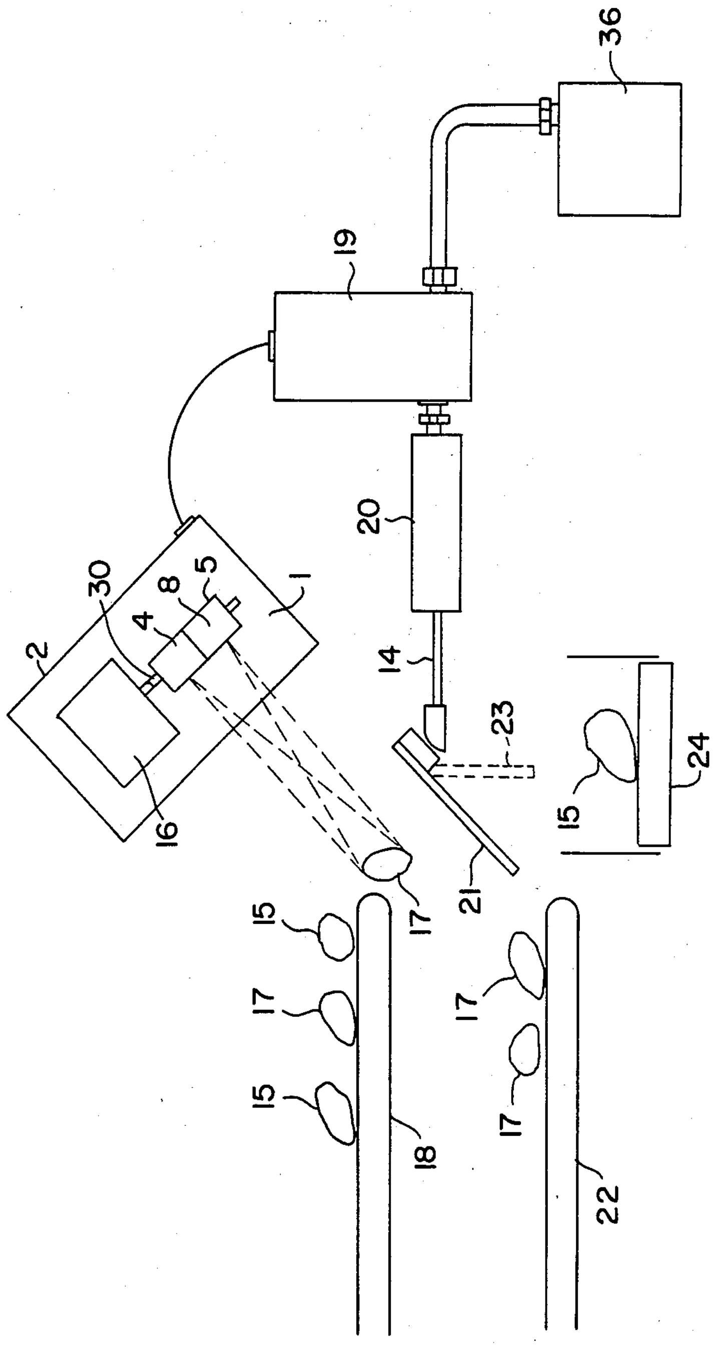
FIG. 2, shows a somewhat schematic; diagrammatic side vie of an application of the invention.
Figure 3:
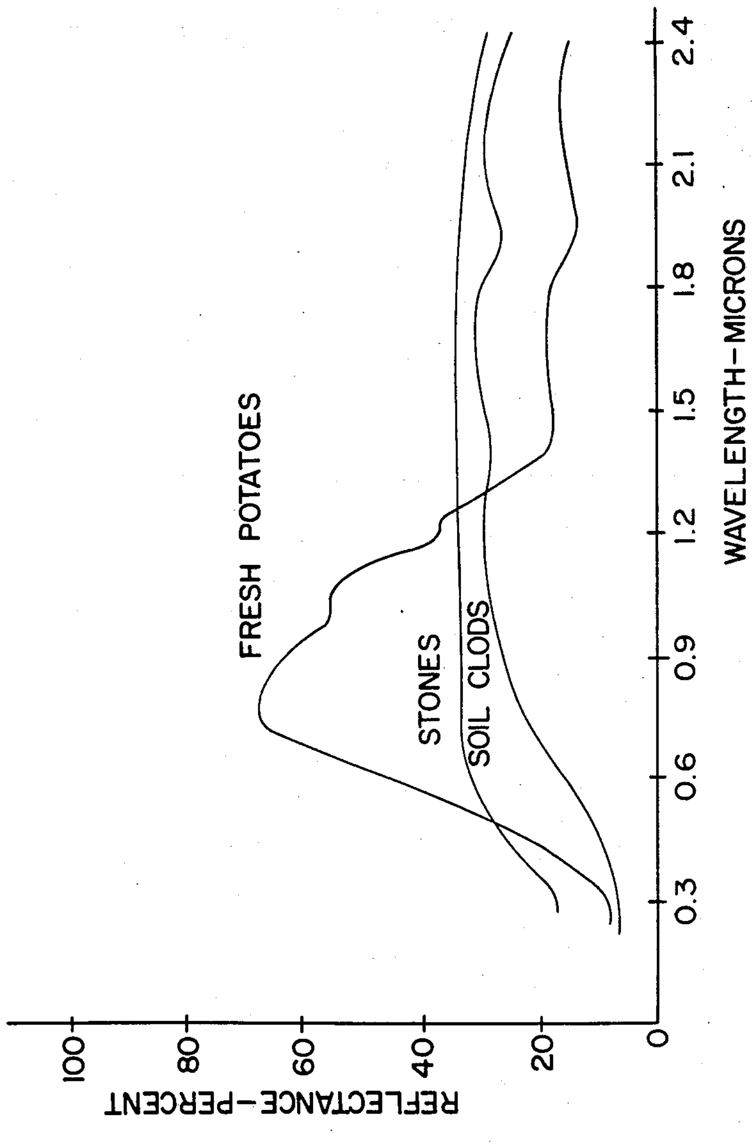
FIG. 3, shows the reflection spectrum of stone and potatoes.

As schematically shown in FIG. 1 and FIG. 1A the detecting device generally designated by 1 is enclosed in a dust- and moisture-proof casing 2. In the embodiment shown in FIG. 1 the detecting device has a light source 3 emitting a broadbanded light which is reflected on the surface 4 of a rotary mirror 5. By rotating the rotary mirror 5 the light scans the scanning region 6 to detect the presence of desired objects 15 and undesired objects 17. The desired objects are generally potatoes and the undesired objects are generally stones or dirt clods. The rotary mirror 5 is mounted on a shaft 30 which is attached to a motor 16. Preferably the width of the scanning region 6 is marked by means of reflecting position indicators 26. The reflectors 26 give a more strongly reflected light than any one of the objects 15 and 17. The light reflected from the objects 15 and 17 is collected via the second surface 8 of the rotary mirror 5 by an optical unit 9 towards a detector unit 10. The detector unit 10 converts different wavelengths of light to electric signals which are amplified by a plurality of amplifiers 11 and compared by electric signal comparer 12 to one another. A microprocessor 13 controls means 14 for separation of non-desired objects 15 and controls the light source 3 and the motor 16, on the shaft 30 of which the rotary mirror 5 is placed. Amplifiers 32 and 34 are used to amplify the signals to the motor 16 and light source 3 respectively. In FIG. 2 one of many applications of the invention is shown. In that case the device is used for separating stones 15 and clods 15 from potatoes 17. The flow of objects (potatoes, stones and clods) arrives on a conveyor belt 18. The detector device 1 scans the objects 15 and 17 in a free fall immediately after they have left the conveyor belt 18. The microprocessor 13 divides the scanning range 6 into a plurality of scanning fields, each of which has a corresponding separation means 14. A decoder 36 activates the separation means 14 for a corresponding scanning field based on the signal from the micropressor. When the micropressor 13 receives a signal from the comparer 12 that an undesired object 15 has been detected, the microprocessor 13 determines which scanning field the undesired object is in and sends a signal to a decoder 36 which activates the separation means 14 for that scanning field. A separation means 14 is activated by activating a compressed-air valve 19 which activates a cylinder 20. The cylinder 20, in turn, controls a rubber-covered finger 21. At a potato signal the finger 21 remains closed and the potato 17 rebounds on the finger 21 and lands on a conveyor belt 22. At an output signal of soil or stone the finger 21 opens to a position 23 and stones and clods fall down onto a conveyor belt 24. The advantage of this is that the strains on the separation means 14 caused by big stones 15 are quite eliminated.

FIG. 4, shows an embodiment of the invention employing a prism 38 located between the optical unit 9 and two detection units 10'. Light which is refracted by the optical unit 9 is broadened by a prism 38 into a broad light beam, a portion of which is detected by each of two detectors 10'. The detection of a particular spectral pattern in the portion of the spectra received by each detector 10' causes that detector to send an electric signal to a comparer 12. Based on the signals from the detectors, the comparer 12 is able to determine if the object being scanned is a desired object or non-desired object and transmits the appropriate signal to the microprocessor 13.

In FIG. 5, prisms 40 and 42 are employed between optical unit 9 and detector units 10'' to divide the light into two portions or light beams having different wavelength spectra and to direct the light beams to the two detectors 10''. A filter 25 is located between each prism 40 and detector unit 10'' which preferably filters light in the range of from about 0.4 to about 0.7 micrometers. Each filter 25 allows energy of the particular wavelength being measured by each detector 10'' to pass through to the respective detector. Comparison of the light beams spectra is carried out as described above for the embodiment of FIG. 4.

The rotary mirror of the present invention can have from 3 to 8 surfaces, one or more of which can be reflecting while the others are non-reflecting.

What is claimed is:

1. A device for assorting objects comprising:

a light source for emitting a light beam;

a rotary mirror connected to a means for rotating said mirror, said mirror comprising a surface having a first part for directing light towards objects in free fall and a second part on the same side of the mirror as the first part for receiving light reflected from the objects, said rotary mirror capable of rotating to direct the reflected light over a scanning range containing said objects in free fall;

an optical unit for refracting light reflected from said surface of said mirror; and a detection means for receiving light retracted by said optical unit, said detection means comprising at least one detector unit, a means for converting wavelengths of light to at least one electric signal, and a means for determining whether an object is a desired object or undesired object based on said at least one electric signal.

2. The device of claim 1 further comprising reflectors which give a more strongly reflected light than any of the objects in free fall, said reflectors being arranged to indicate the beginning and the end of the scanning range of the device.

3. The device of claim 1 wherein said device further comprises a prism located between said optical unit and said detection means for dividing the light refracted by said optical unit into two or more portions which are detectable by said detection means.

4. The device of claim 1, further comprising at least one light filter arranged between said optical unit and said detection means.

5. The device of claim 3 further comprising reflectors which give a more strongly reflected light than any of the objects in free fall, said reflectors being arranged to indicate the beginning and the end of the scanning range of the device.

6. The device of claim 4 further comprising reflectors which give a more strongly reflected light than any of the objects in free fall, said reflectors being arranged to indicate the beginning and the end of the scanning range of the device.

* * * * *